June 11, 1940.  C. G. SERIGHT  2,204,054

REMOTE CONTROL DEVICE

Filed April 18, 1938

INVENTOR.
CARL G. SERIGHT
BY
McConkey Dawson & Booth
ATTORNEYS.

Patented June 11, 1940

2,204,054

UNITED STATES PATENT OFFICE 2,204,054

REMOTE CONTROL DEVICE

Carl G. Seright, Chicago, Ill., assignor to Bendix Radio Corporation, Chicago, Ill., a corporation of Delaware Application April 18, 1938, Serial No. 202,611

4 Claims. (Cl. 172—239)

This invention relates to a remote control device and more particularly to a motor powered device controlled from a remote point for operating an electrical switch. The improved apparatus may, however, be used for other control functions, such as for varying a condenser to tune an electrical circuit.

An object of the invention is to provide improved remote control apparatus in which motor power is employed to effect the desired changes quickly and accurately. A further object is to provide apparatus in which the motor may be stopped after a desired change has been effected and before it is driven by its own momentum to disturb the changed condition.

A common objection to control devices using motor power is that the momentum of the motor tends to carry the controlling member beyond the selected position. For example, in effecting a switching operation, though the motor be deenergized when the switch arm has been moved to a desired position, yet the motor will coast on, and when it finally stops the switch arm will have been moved too far. In view of this tendency it is customary to employ a very low gear drive between the motor and the controlling member, so that this member will not move substantially during the period in which the motor is decelerating to a stop. Such mechanisms are slow in operation and at best do not stop the switch on exactly the correct position. It is an object of this invention to provide drive mechanism by which the control member may be driven rapidly from one position to another and which will avoid further actuation of this member after the motor is deenergized.

To accomplish the objects above stated, I provide driving mechanism which upon continuous operation of the motor will effect discontinuous or intermittent movement of the control member. With such a drive mechanism, the control member is moved from position to position during certain periods in the operation of the motor and during the intervening periods in the motor operation remains motionless.

For taking full advantage of the intervening periods for dissipating the motor momentum, I provide improved means for deenergizing the motor at the proper point in the motor operation. As a secondary advantage of such provision, I obtain more accurate determination of the point at which the motor is deenergized and avoid danger of stopping the mechanism before the control member has reached the selected position.

Other objects and advantages will become apparent as the specification proceeds. A preferred embodiment of the invention is illustrated in the accompanying drawing in which—

Figure 1:
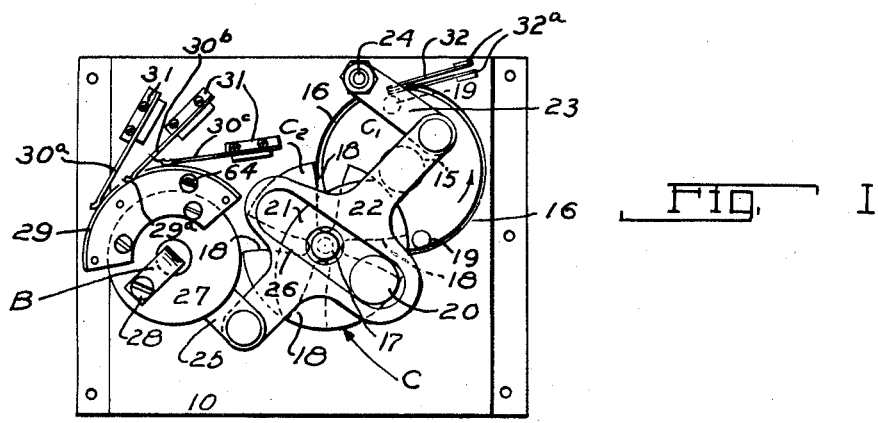
Figure 1 is a plan view of the improved apparatus.
Figures 2, 3:
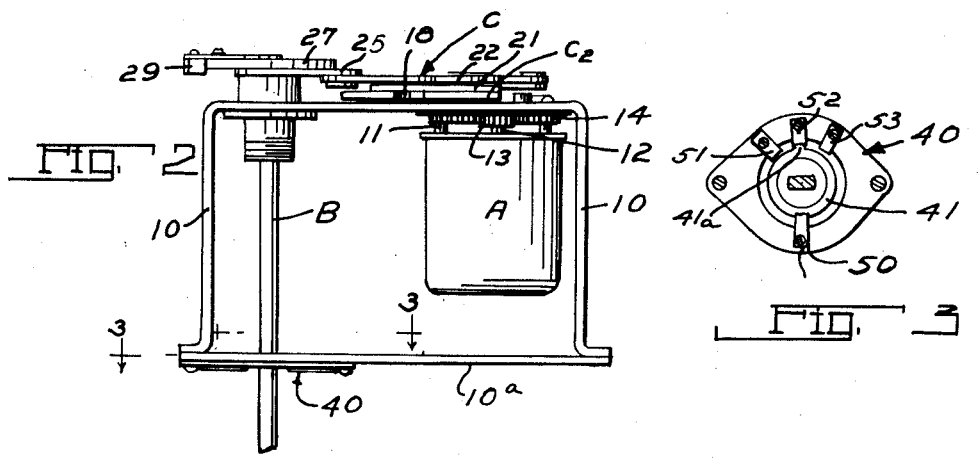
Figure 2 is an elevational view of the apparatus as shown in Figure 1, the controlled switch being shown in section.
Figure 3 is a plan view of the controlled switch, the view being that seen from line 3—3 of Figure 2.

As illustrated, A designates an electric motor; B, a control member; C, drive mechanism connecting the motor in drive relation with the control member; and D, a switch by which operation of the apparatus is controlled.

The motor A may be of any suitable type or size and may be mounted in any convenient manner. As here shown, a frame 10 of inverted U-shaped form is provided, and the motor A has its casing secured to the under side of this frame by means such as posts 11. The motor shaft 12 has attached thereto a pinion 13 which engages a gear 14 rotatably mounted on the bearing post 15 secured to the top of the motor casing. A circular opening 16 is cut in the top of frame 10 and the circular disk member $C_1$, secured to gear 14, extends within this opening. From this it will be clear that the member $C_1$ is in direct drive connection with the motor through gears 13 and 14. It will be understood that this member $C_1$, which may be known as the driving member, may be mechanically connected to the motor by other suitable means.

A driven member $C_2$ is in the form of a disk and is rotatably mounted on the post 17 which projects upwardly from frame 10 at a point near the periphery of opening 16. Member $C_2$ is provided with radial slots 18 which extend inwardly from its periphery. As here illustrated, four spaced slots or recesses 18 are provided, but other numbers of slots may be used according to the control movements desired.

The driving member $C_1$ carries the two pins 19 which are located eccentrically on the member and project upwardly therefrom. If so desired, other members or pins like pins 19 may be located at angularly spaced positions about the pivot point of member $C_1$. Rotation of the driving member $C_1$ causes one of pins 19 to enter one of the slots 18, and through engagement with a side of this slot move driven member $C_2$. The corners of disk $C_2$ are rounded at the mouths of slots 18 so as to facilitate the entrance of pins 19 into these slots.

A pin 20 projects upwardly from an eccentric position on member C₂, and secured to the top of this member is a bearing plate 21 which has an opening through which pin 20 extends. Slidably positioned on the top surface of bearing plate 21 is the yoke lever 22 of the general shape shown in Figure 1. One end of yoke 22 is pivotally attached to an end of link 23 the other end of which is connected to post 24 secured to the frame. The other end of the yoke 22 is connected to the end of pivoted crank arm 25. The central portion of yoke 22 is expanded and contains the transverse slot 26 into which the pin 20 is received. Preferably, the axis of slot 26 is inclined with respect to the longitudinal axis of lever 22, for a purpose which will appear more clearly hereinafter. In the embodiment shown, the slot 26 is inclined about 10° from a perpendicular with a line between the two end pivot points.

It will be clear that as driven member C₂ rotates, pin 20 will move along slot 26 and will impart an oscillating longitudinal movement to lever 22. Preferably, crank arm 25 should be the same length as link 23, so that the lever 22 will not be displaced angularly as it oscillates.

Crank arm 25 may be arranged in the frame in any suitable manner. In the construction shown, a disk 27 is secured to arm 25 and the control member B, in the form of a flattened shaft, is secured by having its end portion extended through central openings in the arm and disk, the extreme end being secured by screw 28. While I have described the particular structure made up by crank 25, shaft B, and disk 27, it is apparent that a single part might be substituted for this control unit, if so desired.

To the disk 27 is attacked the conductor segment 29 which has a recess 29ᵃ at its central portion. Contacting the periphery of segment 29 are the spaced finger contacts 30ᵃ, 30ᵇ and 30ᶜ, which at their base ends are supported on the frame by the insulated posts 31.

A pair of spring contacts 32 are supported on posts 32ᵃ located adjacent the driving member C₁. These contacts are arranged to maintain themselves apart except when one of the pins 19 is in position to maintain them in engagement.

In the illustrated embodiment is shown a switch 40 the operation of which is controlled by the improved mechanism. The stator of switch 40 is secured to the frame member 10ᵃ, and the rotor is secured to the flattened shaft member. One contact 50 mounted on the stator of this switch, makes permanent contact with the conductor ring 41 on the rotor, and the projection 41ᵃ of ring 41 is adapted to make contact with one of contacts 51, 52 or 53, depending on the angular position of shaft B. It is understood that any suitable type of switching mechanism may be substituted for the type illustrated. I have found that the improved mechanism is very useful for controlling the operation of a band switch for radio receiving and transmitting apparatus. However, it will be apparent that the movable member B may be mechanically connected to the device which is to be controlled and the controlling function effected directly through the actuation of this control member.

Figure 4:
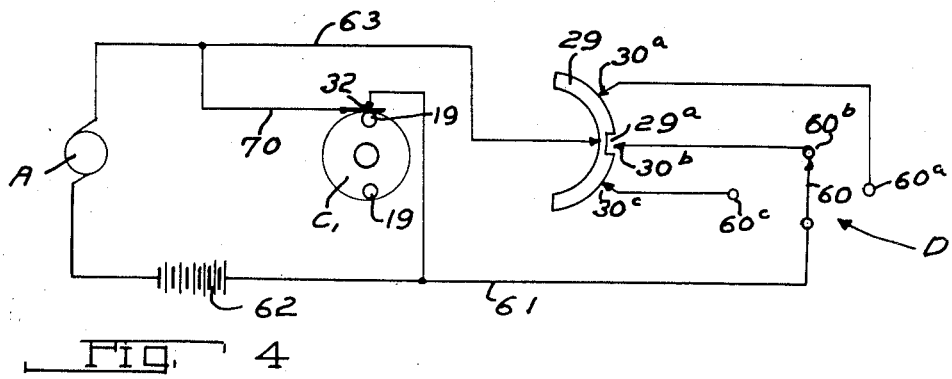
Figure 4 is a schematic diagram showing the electrical circuit.

The electrical circuit for the improved apparatus is illustrated in Figure 4. The control switch D, as here illustrated, has a movable arm 60 and three contacts, 60ᵃ, 60ᵇ, and 60ᶜ, the arm 60 being connected by conductor 61 with one side of a source of electrical energy 62, and the contacts 60ᵃ, 60ᵇ, and 60ᶜ being connected respectively to the spring fingers 30ᵃ, 30ᵇ and 30ᶜ. This switch may be located at any point and the connectors brought to it in the form of a cable if so desired. The connector 63 has its one end in electrical connection with segment 29 by attachment to post 64, and connects at its other end with one side of motor A. The other side of the motor is connected to the remaining terminal of the source 62.

An auxiliary electrical path 70 is bridged across the above described circuit and includes the spring contacts 32. As is schematically illustrated in Figure 4, this path is intended to be completed when a pin 19 is in such position as to maintain contacts 32 closed.

*Operation*

In the position shown in the drawing the apparatus is at rest and the control member B is in its central position. If the operator at the remote point moves switch arm 60 to point 60ᵃ, a motor energizing circuit will be completed through spring finger 30ᵃ and conductor segment 29, and the motor will start to rotate. Rotation of the motor causes rotation of driving member C₁ in a counterclockwise direction as seen from Figure 1, and upon engagement of pin 19 with one of slots 18, the driven member C₂ will be actuated in a clockwise direction. With the spacing and arrangement illustrated, the driven member C₂ will be rotated at once through one quarter revolution, and this movement causes the control member B to be moved in a clockwise direction. The insulating recess 29ᵃ is moved under the spring finger 30ᶜ, and since the motor energizing circuit remains completed through the spring finger 30ᵃ, the driven member C₂ is again rotated in a clockwise direction. The pin 20 is carried toward the opposite end of the yoke slot 26, reversing the direction of movement of yoke 22 and causing a counterclockwise movement of control member B to return the recess 29ᵃ to its central position. As rotation of C₂ continues, the yoke 22 is moved to its limit of travel toward the upper right and so brings the recess 29ᵃ under the spring finger 30ᵃ. When the spring finger 30ᵃ first comes into register with the segment recess 29ᵃ, the electrical contact between this finger and the conductor segment will be broken and the motor energizing circuit above mentioned will be opened. Preferably, the mechanism is so timed that this event takes place at the time the driven member C₂ has completed its movement or shortly before this time.

When spring finger 30ᵃ comes into register with recess 29ᵃ, or shortly before, one of pins 19 will have moved into position to close contacts 32, closing the auxiliary path and completing the auxiliary motor energizing circuit. In this way the motor remains energized until the pin 19 has moved from beneath contacts 32. When pin 19 moves to allow contacts 32 to open, this breaks the auxiliary energizing circuit and the motor is deenergized. The motor will then coast to a stop, and it may be noted that while the motor is decelerating the driving member C₁ is being turned but the driven member C₂ is not. From this it will be clear that the movement of the motor while decelerating is not in any way affecting the final position of the control member B.

Then if the switch arm 60 is moved from point 60ᵃ to 60ᵇ, the motor energizing circuit will be completed through spring finger 30ᵇ, and the control member B will be moved back to central position. The energizing circuit will remain closed until finger 30ᵇ comes into register with the recess 29ᵃ, and subsequent to this the auxiliary energizing circuit will remain closed until one of pins 19 allows contacts 32 to separate. Upon deenergization of the motor the mechanism stops motion during the interval when the driven member C₂ is not actuated. Similarly when the operator moves switch arm 60 to point 60ᶜ, the control member is moved to a third angular position and the motor is allowed to stop in the same manner.

The three different positions of the control member B above described may represent the three different positions of the switch 40, or may represent three different conditions of any mechanism to which the member B is connected. While in the description here given only three different control positions have been provided for the invention is not limited to this number. For example, if it is desired to have four control positions, the driven member C₂ should have six slots and should be mounted at greater spacing from member C₁, so that in a single movement member C₂ would rotate ⅙ revolution.

Due to the inclination of the slot 26, the central position at which control member comes to rest is not quite the same when approached from different directions. Note in Figure 1 that when member B completes its movement to the central position, in a clockwise direction the lever 22 will be in a position farther forward when contacts 32 are allowed to separate than when this member completes its movement to the central position in a counterclockwise direction and the contacts 32 are allowed to separate. It has been found that the engagement between shaft B and the rotors of switches such as switch 40 is never perfect and that there is a slight amount of lost motion between the control member and the movements of the controlled switches. This variation in the position at which shaft B comes to rest when moved in different directions adequately compensates for this loss of motion between the shaft and switch rotor elements. By this construction the switch rotor elements are made to rest on exactly the same central position regardless of which way this position is approached.

While I have described only a single embodiment of the invention, it is understood that other embodiments may be constructed, and many changes may be made in the details of construction without departing from the spirit of the invention. For example, while in the described embodiment, the driving member C₁ is provided with two pins 19, other numbers of these pins may be used as may be desired; the fewer the number of pins, the smaller will be the ratio of the periods of control movement to the intervening periods. The position of the contacts 32 must, of course, be angularly altered to correspond with the number of pins or projections used on member C₁.

The foregoing detailed description has been given for clearness of understanding only, and no unnecessary limitations should be understood therefrom, but the appended claims should be construed as broadly as permissible in view of the prior art.

What is claimed is:

1. In remote control apparatus, a movable control member, an electric motor, a rotatable driving disk having an eccentrically positioned pin, a rotatable driven disk having radial slots therein for receiving said pin as said driving disk is rotated, said pin being arranged to engage said slots for forming the drive connection between said disks, a pin carried in eccentric position on said driven disk, a yoke member in engagement with and actuated by said last-mentioned pin, said yoke member being connected with said control member and adapted to impart reciprocal movement to said control member upon rotational movement of said driven member, circuit means operable from a remote point for energizing said motor whereby said motor is set into rotation, and means for deenergizing said motor to stop rotation of said motor when said control member has been moved to a predetermined position and after said first-mentioned pin has moved out of engagement with the slots of said driven disk.

2. In remote control apparatus, a movable control member, an electric motor, rotatable driving and driven members, said members being equipped with engaging means for producing intermittent rotation of said driven member upon continuous rotation of said driving member, mechanical connecting means between said driven member and said control member for producing reciprocal movement of said control member upon rotational movement of said driven member, circuit means controllable from a remote point for energizing said motor, and means for stopping said motor after said control member has been moved to a predetermined position and between intermittent movements of said driven member.

3. In remote control apparatus, a movable control member, a motor, driving mechanism actuated by said motor and effective during certain spaced periods in the operation of said motor for moving said control member in one direction, said mechanism being effective during other of said periods for moving said control member in a reverse direction and being ineffective to move said control member during intervening periods in the operation of said motor, means operable from a remote point for energizing said motor for moving said control member, and means for deenergizing said motor during the first part of the intervening period after said control member has been moved to a predetermined position irrespective of which direction said control member has been moved to said predetermined position.

4. In remote control apparatus, a pivoted control member, an electric motor, driving mechanism actuated by said motor for moving said member in forward and reverse directions about its pivot point, a recessed conductor segment associated with said control member, a motor energizing circuit including said segment and a stationary contact slidably engaging said segment and adapted to break said circuit during the interval in which the recess of said segment is in registry with the contact, an auxiliary energizing circuit for maintaining said motor in operation after said circuit is broken until a predetermined point in the operation of said motor, and means within said driving mechanism for shifting said interval of registry with respect to said point in the operation of said motor, whereby the motor may be deenergized in the first part of said interval irrespective of the direction in which said control member is moved.

CARL G. SERIGHT.